(12) United States Patent
Batson et al.

(10) Patent No.: US 8,694,670 B2
(45) Date of Patent: *Apr. 8, 2014

(54) TIME SYNCHRONIZATION OF MULTIPLE TIME-BASED DATA STREAMS WITH INDEPENDENT CLOCKS

(71) Applicant: Apple Inc., Cupertino, CA (US)

(72) Inventors: James D. Batson, Saratoga, CA (US); John S. Bushell, San Jose, CA (US); Gregory R. Chapman, San Jose, CA (US); Christopher L. Flick, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,175

(22) Filed: Oct. 12, 2012

(65) Prior Publication Data

US 2013/0117597 A1    May 9, 2013

Related U.S. Application Data

(63) Continuation of application No. 12/816,265, filed on Jun. 15, 2010, now Pat. No. 8,316,147, and a continuation of application No. 11/651,354, filed on Jan. 8, 2007, now Pat. No. 7,765,315.

(51) Int. Cl.
 *G06F 15/16*    (2006.01)
(52) U.S. Cl.
 USPC ........... 709/231; 709/248; 713/502; 713/503; 713/601
(58) Field of Classification Search
 USPC .................. 709/231, 248; 713/502–503, 601
 See application file for complete search history.

(56) References Cited

U.S. PATENT DOCUMENTS

| | | | |
|---|---|---|---|
| 5,603,016 A | | 2/1997 | Davies |
| 5,617,502 A | * | 4/1997 | Ort et al. .................. 386/211 |
| 5,655,144 A | | 8/1997 | Milne et al. |
| 5,664,044 A | | 9/1997 | Ware |
| 5,940,504 A | | 8/1999 | Griswold |
| 6,023,767 A | * | 2/2000 | Kumar et al. ............. 713/400 |
| 6,075,576 A | | 6/2000 | Tan et al. |
| 6,078,725 A | | 6/2000 | Tanaka |
| 6,366,791 B1 | | 4/2002 | Lin et al. |
| 6,385,591 B1 | | 5/2002 | Mankoff |
| 6,389,473 B1 | | 5/2002 | Carmel et al. |

(Continued)

FOREIGN PATENT DOCUMENTS

| | | |
|---|---|---|
| EP | 1076461 | 2/2001 |
| EP | 1610558 | 12/2005 |

OTHER PUBLICATIONS

Rothermel et al., "Clock Hierarchies: An Abstraction for Grouping and Controlling Media Streams," IEEE Journal on Selected Areas in Communications, IEEE Service Center, vol. 14, No. 1, Jan. 1, 1996, 12 pgs.

*Primary Examiner* — Duyen Doan
(74) *Attorney, Agent, or Firm* — Kenyon & Kenyon LLP

(57) ABSTRACT

Techniques are described for synchronizing multiple time-based data streams with independent clocks wherein relationships between clock rates of timing devices associated with the time-based data streams are determined, and based on these relationships, times in at least one of the time-based data streams may be translated to times in any of the other time-based data streams despite the data streams having independent clocks.

20 Claims, 5 Drawing Sheets

(56) References Cited

U.S. PATENT DOCUMENTS

| | | | |
|---|---|---|---|
| 6,510,279 B1 | 1/2003 | Morishita | |
| 6,598,172 B1 * | 7/2003 | VanDeusen et al. | 713/503 |
| 6,832,230 B1 | 12/2004 | Zilliacus et al. | |
| 6,941,484 B2 * | 9/2005 | To et al. | 713/500 |
| 7,035,246 B2 | 4/2006 | Taylor | |
| 7,197,658 B2 * | 3/2007 | Lienhart et al. | 713/400 |
| 7,202,803 B2 * | 4/2007 | Evans | 341/50 |
| 7,239,581 B2 * | 7/2007 | Delgado et al. | 368/10 |
| 7,245,684 B2 * | 7/2007 | Adkisson | 375/359 |
| 7,403,139 B2 | 7/2008 | Sasakura et al. | |
| 7,409,574 B2 * | 8/2008 | Siegwart | 713/502 |
| 7,474,724 B1 | 1/2009 | Gudmunson et al. | |
| 7,495,705 B2 * | 2/2009 | Baldwin et al. | 348/512 |
| 7,519,845 B2 * | 4/2009 | Chen | 713/500 |
| 7,532,241 B2 * | 5/2009 | Rengakuji | 348/262 |
| 7,765,425 B1 * | 7/2010 | Searles et al. | 713/503 |
| 8,190,680 B2 * | 5/2012 | Spilo et al. | 709/204 |
| 2003/0103766 A1 | 6/2003 | Sugahara et al. | |
| 2004/0160911 A1 | 8/2004 | Zilliacus et al. | |
| 2004/0187043 A1 | 9/2004 | Swenson et al. | |
| 2005/0144496 A1 | 6/2005 | Lienhart et al. | |
| 2005/0166079 A1 * | 7/2005 | Lienhart et al. | 713/500 |
| 2006/0002681 A1 * | 1/2006 | Spilo et al. | 386/46 |
| 2006/0007356 A1 * | 1/2006 | Junkersfeld et al. | 348/515 |
| 2006/0024024 A1 | 2/2006 | Chen et al. | |
| 2006/0053455 A1 | 3/2006 | Mani et al. | |
| 2006/0104397 A1 * | 5/2006 | Lottis et al. | 375/372 |
| 2006/0146850 A1 * | 7/2006 | Virdi et al. | 370/412 |
| 2006/0184697 A1 * | 8/2006 | Virdi et al. | 709/248 |
| 2007/0092224 A1 * | 4/2007 | Tsukagoshi et al. | 386/96 |

* cited by examiner

TIME SYNCHRONIZATION OF MULTIPLE TIME-BASED DATA STREAMS WITH INDEPENDENT CLOCKS

PRIORITY CLAIM

This application is a continuation of U.S. application Ser. No. 12/816,265, filed Jun. 15, 2010, which is a continuation of U.S. application Ser. No. 11/651,354, entitled "TIME SYNCHRONIZATION OF MULTIPLE TIME-BASED DATA STREAMS WITH INDEPENDENT CLOCKS", filed on Jan. 8, 2007, now U.S. Pat. No. 7,765,315. This referenced application is incorporated in its entirety herein by reference.

FIELD OF THE INVENTION

The present invention relates to time-based data and, more specifically, to an approach for synchronizing multiple time-based data streams that are driven by unrelated clocks.

BACKGROUND

Time-based data such as video sequences, audio sequences, financial results, and laboratory data recorded over time may be represented in the metaphor of a "movie." Examples include QuickTime™ movies and movie objects from Apple Computer, Cupertino, Calif.

A common need with regard to time-based data, such as a movie object with video, audio, and closed captioning, is that all elements of the movie need to be synchronized. For example, the audio needs to match the video, so that an actor's lips match the words that are being spoken, and the closed captioning needs to match the words being spoken. This synchronization needs to remain consistent in the event the movie data is fast forwarded, paused, reversed, or stopped and then restarted at a point existing later in the movie.

One approach to controlling timing issues in movies and synchronization of data within the movies is the use of a clock and time bases derived from the clock. In general, clock components are always moving and derive their timing information from some external source; for example, an audio clock based on a crystal timing mechanism, to provide the basic timing. Time bases describe the context of time in the currently-playing movie; for example, where the current position of the movie is compared to the entirety of the movie data. Under one approach, time bases rely on either a clock component or another time base for their time source.

Using this approach, time can be converted from one time base into a time that is relative to another time base, but only if both time bases rely on the same time source, such as a clock driven by one specific audio device. For example, in order to synchronize audio and video data, current approaches have the audio time base and video time base rooted in the audio clock. This is because while frames may be dropped from video playback or sent to a display at a higher or lower rate without perceptibly changing the viewing experience, it is more difficult to play audio faster or slower without changing the listening experience.

While the audio and video time bases are independent, it is because they are rooted in the same time source that this manipulation of the time bases is made possible. Current approaches use algebraic manipulation to derive relationships between independent time bases rooted in the same time source.

A drawback to current approaches is that current approaches are unable to derive accurate relationships between time bases rooted in different time sources. Therefore, under prior approaches, when there are independent audio and video clocks, synchronization is not possible. Another example is when audio is recorded into a computer, the audio data may be clocked by a crystal clock on the sound card, and not all crystal clocks run at exactly the same speed. In a system with two or more sound cards, each sound card having a clock, when recording via one sound card and playing back via another, the playback speed may be slightly different. Although both sound cards may nominally be clocking data in and out at exactly 44.1 kHz, for example, in fact they will have fractionally different sampling rates because they have fractionally different clock speeds.

This leads to problems in a system where one clock cannot be designated as the master clock; for example, synchronizing audio to an external digital timing clock. Because the external clock may not run at exactly the same speed as the clocks on the sound cards, drift between the tracks may be introduced, and because no approach exists to define accurate relationships between time bases based on disparate clocks, the drift cannot be rectified. Similar problems arise when audio is stable but one desires to synchronize audio data and video data, each with an independent time base rooted in a common clock, to an outside source, such as a MIDI sequencer. The MIDI sequencer has its own clock, and if the master device runs a little slow, the MIDI sequence tempo will drop to match it, but the audio and video may carry on at their original rates, causing the MIDI to drift relative to the audio and video.

Therefore, an approach that allows for synchronization of time-based data that have independent clock sources and for derivation of accurate relationships between the time bases rooted in each clock, which does not experience the disadvantages of the above approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
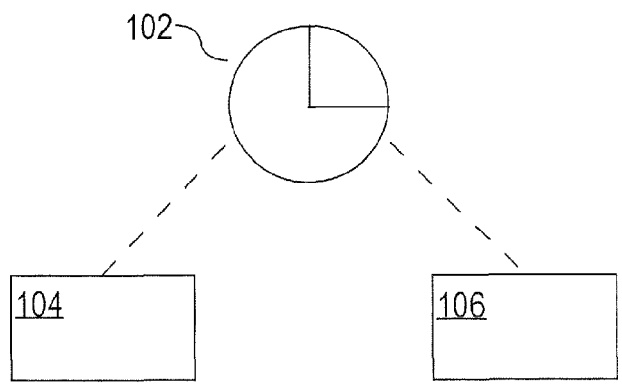
FIG. 1A is a block diagram illustrating a geometric example of a time coordinate system and a time base.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described for synchronizing multiple time-based data streams with independent clocks wherein relationships between clock rates of timing devices associated with the time-based data streams are determined, and based on these relationships, times in at least one of the time-based data streams may be translated to times in any of the other time-based data streams despite the data streams having independent clocks.

According to an embodiment, a first relationship between a clock rate of a first timing device and a clock rate of a common reference is determined, along with a second relationship between a clock rate of a second timing device and the clock rate of the common reference. Based on the first relationship and the second relationship, a third relationship is calculated between a first set of time-based data that is based on the first timing device and a second set of time-based data that is based on the second timing device. According to an embodiment, a time stamp in a time base rooted in a first timing device may be translated to a time stamp in a time base rooted in a second timing device.

According to an embodiment, a point within a first time-based data stream that is associated with a time value generated based on a first timing device is identified, and a corresponding point in a second time-based data stream that is associated with a time value that was generated based on a second timing device that is different than the first timing device is determined, based on the difference between the clock rate of the first timing device and a third timing device, and the difference between the clock rate of the second timing device and a third timing device.

According to an embodiment, a first rate scaler between the clock rate of a first timing device and the clock rate of a common timing device is calculated along with a second rate scaler between the clock rate of a second timing device and the clock rate of a common timing device. Then, a time in a first time base running at a first rate and rooted in the first timing device is translated to a time in a second time base running at a second rate and rooted in the second timing device. In an embodiment, this step is performed by analyzing data including the first rate scaler, the second rate scaler, the time in the first time base, a pair of times each different from the time in the first time base, measured at the same time, one of the pair of times based on the first time base and the other of the pair of times based on the first timing device, the rate associated with the first time base, and the rate associated with the second time base.

According to an embodiment, consumption of a first set of video frames may be driven based on a first rate and a first set of anchor time stamp pairs, neither of which are associated with any particular time base. Consumption of a second set of video frames may be driven based on a second rate and a second set of anchor time stamp pairs, neither of which are associated with any particular time base. Then, a relationship is determined between the first set of video frames and the second set of video frames based on the difference between the clock rate of the timing device associated with the first set of anchor time stamp pairs and the clock rate of a third device, and the clock rate of the timing device associated with the second set of anchor time stamp pairs and the clock rate of a third device.

Time Clocks and Time Bases

Clocks are used in computer systems to assist in coordinating the flow of data. For example, every computer contains an internal clock that regulates the rate at which instructions are executed and synchronizes all the various computer components. This is usually an electronic device in a computer that issues a steady high-frequency signal. Other computer components, such as an audio card, may have a clock as well. These clocks are always moving during operation of the device.

A movie's time base defines the rate at which time passes for the movie, and specifies how, moment to moment, the movie's current time can be computed from the time base's time source. Time bases rely on either a clock component or another time base for their time source. The rate specifies the speed and direction in which time travels in a movie. Negative rate values reflect movement backward through a movie's data; positive values reflect forward movement. For example, when the rate is 1.0, the movie plays at its normal speed, meaning that for each second of play the movie's time advances by one second. If the rate is between 0.0 and 1.0, the movie plays in slow motion, and for each second of play the movie's time advances by less than one second. A negative rate implies that the movie is playing backward. A rate of 0 means that the movie is stopped. The time base's time source may be a clock or another time base.

According to an embodiment, a time base specifies an equation for calculating the time base's current time (t_base) based on the time source's current time (t_source) in terms of the time base's rate and an anchor moment. The anchor moment indicates a pair of times: one measured on the time base (anchor_base) and one measured on the time source (anchor_source) that occurred at the same time. According to an embodiment, one or more of these times are based on or defined by time stamp data. An example equation for determining a particular time in a time base is:

$$t\_base = ((t\_source - anchor\_source) * rate) + anchor\_base.$$

In this example, if the rate is zero, "t_base" is simply "anchor_base." "anchor_source" would be ignored and definition unnecessary.

FIG. 1A is a block diagram 100 illustrating the relationship of a time clock and related time bases. As described earlier, the time clock 102 may be a CPU system clock, an audio clock based on a crystal on an audio card or other device, a network clock, or any other type of timing device. Examples of timing devices include: interrupts based on video timing (VBL on a display; or, the house sync signal in a broadcast studio); data coming over a serial interface such as a MIDI sequencer; SMPTE timecode; timing information delivered via radio (e.g., GPS); and an atomic clock.

The time clock 102 is always moving and driven by an external measure, such as the aforementioned crystal. In FIG. 1A, two time bases 104, 106 are based on the time clock 102. As an example, one time base 104 could be the time base for video in a movie and the second time base 106 could be the time base for audio in the movie. The clock 102 could be the audio clock, as explained earlier. By having the video and audio time bases 104, 106 independent and based on the same clock 102, operations may be performed on each to maintain synchronization between the video and audio elements of the movie. For example, for a specific frame of the movie, the specific portion of audio content that relates to a video frame may be derived by algebraically evaluating each time base 104, 106.

For example, for a specific frame of the movie, the specific portion of audio content that relates to the frame may be derived algebraically, in the context of time. In the following example equations, "t_video" is the current time in the video time base, "t_audio" is the current time in the audio time base, "t_clock" is the time clock's current time, "rate_video" is the rate at which the video content is playing, and "rate_audio" is the rate at which the audio content is playing. Further, the anchor moment for the video content is indicated by two times measured at the same moment: "anchor_clock_video" is a time measured on the time clock and "anchor_video" is a time measured on the video time base. The anchor moment for the audio content is indicated by two times measured at the same moment: "anchor_clock_audio" is a time measured on the time clock and "anchor_audio" is a time measured on the audio time base. According to an embodiment, all times are measured by evaluating time stamp data.

According to an embodiment, a specific time in the video time base may be evaluated by the example equation:

$$t\_video=((t\_clock-anchor\_clock\_video)*rate\_video)+anchor\_video$$

According to an embodiment, a specific time in the audio time base may be evaluated by the example equation:

$$t\_audio=((t\_clock-anchor\_clock\_audio)*rate\_audio)+anchor\_audio$$

Provided that rate_video is nonzero, the video equation may be rewritten:

$$t\_clock=((t\_video-anchor\_video)/rate\_video)+anchor\_clock\_video$$

Hence, the specific time in the audio time base that relates to the time in the video time base associated with the video frame may be derived from the following example equation:

$$t\_audio=((((t\_video-anchor\_video)/rate\_video)+anchor\_clock\_video-anchor\_clock\_audio)*rate\_audio)+anchor\_audio.$$

Through this approach, the video controller, based on the video time base, can perform operations on what the video controller believes the local time should be, and the audio controller, based on the audio time base, can perform operations on what the audio controller believes the local time should be. A time base may have as its time source a clock or another time base.

Figure 1B:
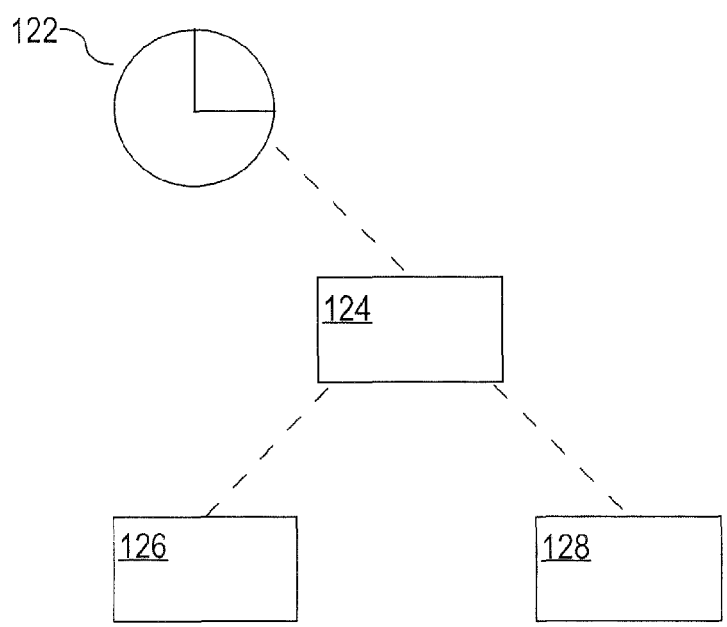
FIG. 1B is a block diagram illustrating a time base having a time base as its time source.

FIG. 1B is a block diagram 120 illustrating a time base having a time base as its time source. In FIG. 1B, two time bases 126, 128 are based on a time base 124, such as for a movie. As an example, one time base 126 could be the time base for video in the movie and the second time base 128 could be the time base for audio in the movie. The clock 122 could be the system clock. In this example, the video time base 126 and audio time base 128 of the movie could be simultaneously stopped, started, or have their rates changed by manipulating the rate of the movie time base 124.

Figure 2:
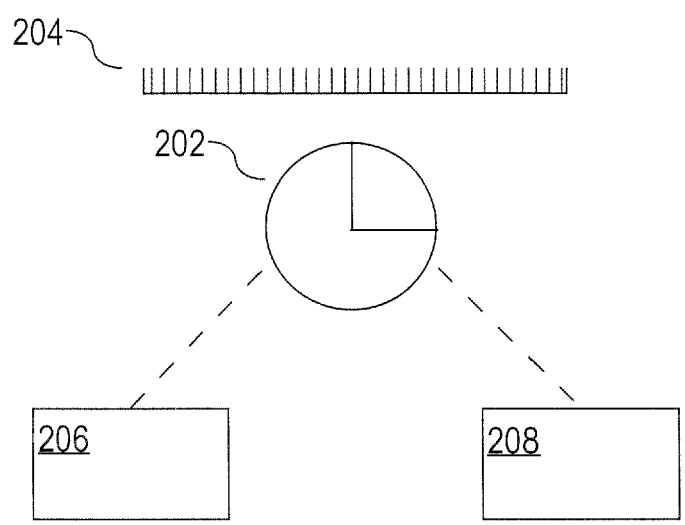
FIG. 2 is a block diagram illustrating an example of separate clocks and time bases based on the clocks.
Figure 2:
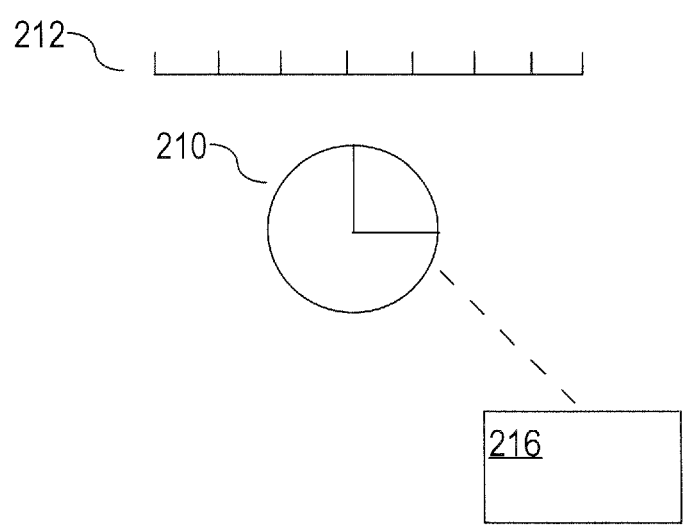

FIG. 2 is a block diagram 200 illustrating an example of separate clocks and time bases based on the clocks. In FIG. 2, a first clock 202, such as a system clock or audio clock, has two time bases 206, 208 based upon it. The first clock 202 runs at a constant rate 204, represented in FIG. 2 by ticks on a graph 204. A second clock 210 has one time base 216 based upon it and runs at a constant rate 212, which may be different from the rate of the first clock 204. There is always a limit to the precision with which a physical device's oscillation frequency can be engineered, and cost reasons may lead to the building of devices with less precision. Some devices change their frequency as the temperature changes. While approaches exist to make one device's frequency follow another's, if no such approach is used, the devices' frequencies will be independent and they must be expected to drift.

Figure 3:
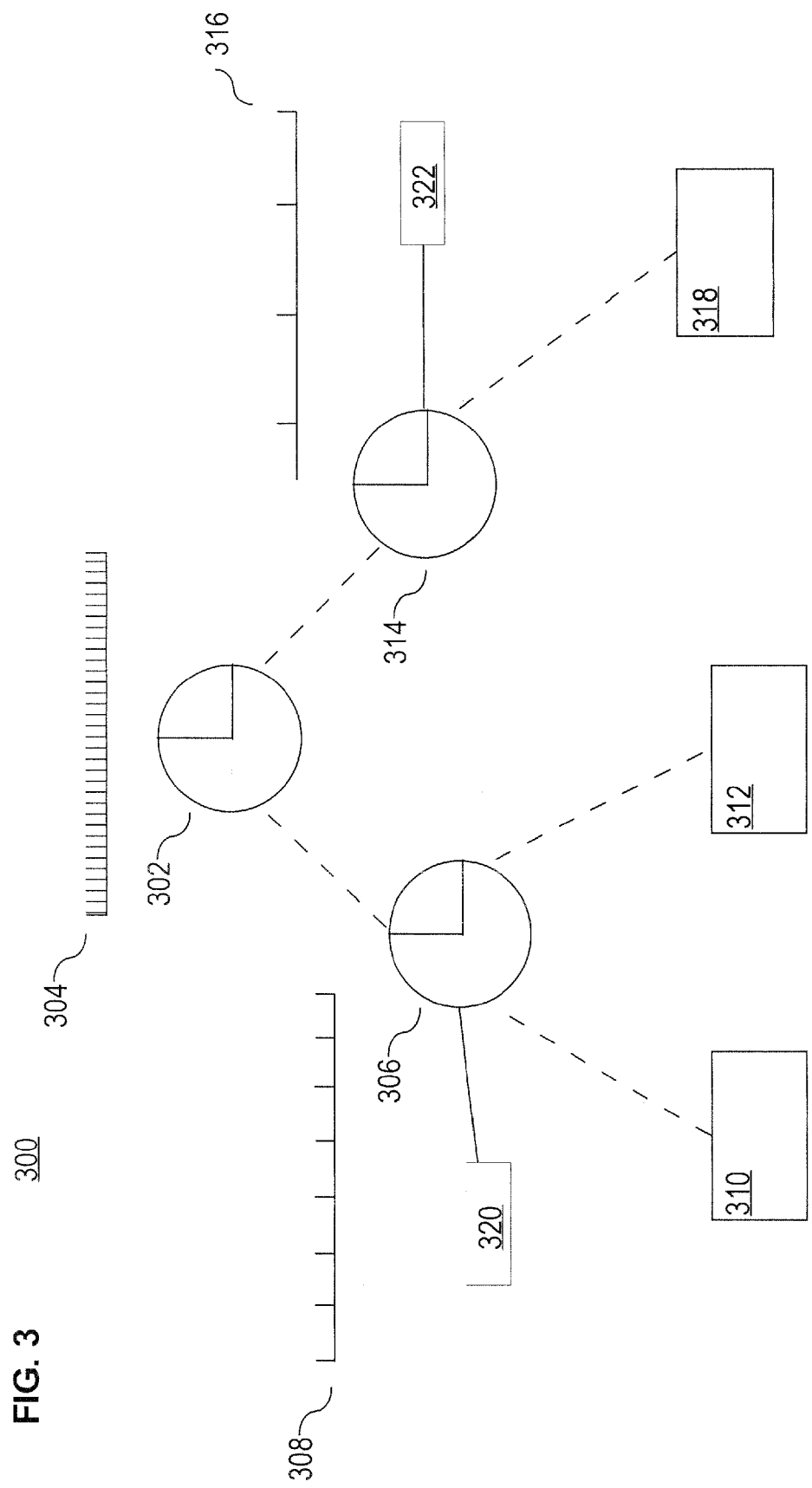
FIG. 3 is a block diagram illustrating an example embodiment using a common reference clock to relate disparate time clocks and their dependent time bases.

FIG. 3 is a block diagram 300 illustrating an example embodiment using a common reference clock 302 to synchronize multiple time-based data streams with independent clocks. For purposes of this example, the time clocks are an audio clock 306 and a video clock 314 along with their dependent time bases, but it should be understood that any number of clocks may be rooted in the common reference clock and that the example of a video clock and audio clock is for illustrative purposes only and should not be considered as a limitation upon any embodiment of the invention. In FIG. 3, there exists a common reference clock 302 to which all other clocks 306, 314 have a relationship. According to an embodiment, this relationship allows the calculation of an acceptable approximation of a representation of the relation between disparate time bases, even though the time bases do not have the same clock as their origins. For example, a timestamp in one time base may be translated to a timestamp in another time base even though the time bases are not derived from the same clock or share a common source time base. As another example, a time duration in one time base may be translated to a time duration in another time base even though the time bases are not derived from the same clock or share a common source time base. According to an embodiment, the calculation of the relationship between the disparate time bases allows for synchronization of multiple time-based data streams with independent clocks.

According to an embodiment, the common reference clock 302 is the CPU clock, although alternate embodiments exist wherein the common reference clock 302 is not the CPU clock, or may be any external time measurement to which the audio and video clocks 306, 314 have communicative access, such as an audio clock or a network clock. According to an embodiment, the audio clock 306 or video clock 314 may serve as the common reference clock 302.

In FIG. 3, the common reference clock 302 runs at a constant rate 304, which in this example is different from the audio clock rate 308 and the video clock rate 316. In alternate embodiments, the clocks may run at the same rate, or may run at rates that change independently over time. There are two time bases 310, 312 based upon the audio clock 306 and one time base 318 based upon the video clock 314. For example, the time bases 310 and 312 could control two audio tracks which must be mixed and then played in sync with the video track. The audio clock 306 and the video clock 314 run at different rates 308, 316.

According to an embodiment, each clock that is rooted in a common reference clock 302 has associated with it data that defines its rate scaler 320, 322 relative to the clock's immediately superior clock, which in this example is the common reference clock 302. As an example, if there were four clocks in the tree of clocks, each above the other, the rate scaler data for each clock would define the clock's rate scaler relative to the clock immediately above the clock at issue. The rate scaler is the ratio of the clocks' rates of advancement and in an embodiment is calculated based on timestamp data. If two clocks are in sync, the rate scaler between them is 1.0. If audio clock 306 is running 5% faster than the common reference clock 302, the rate scaler between them will be 1.05. According to an embodiment, the rate scaler is calculated by evaluating at least two sets of timestamp data and determining the difference between the timestamps. For example, a timestamp data T1 may be received from the common reference clock 302 and the audio clock 306 at the same point and timestamp data T2 may be received from the common reference clock 302 and the audio clock 306 at the same point but later than T1. According to an embodiment, the rate scaler associated with the audio clock 320 may be calculated by the formula (audio clock T2−audio clock T1)/(common reference clock T2−common reference clock T1), although other approaches of calculation are envisioned. According to an embodiment, rate scalers change over time, so they may be measured periodically.

According to an embodiment, the common reference clock 302 and time scaler data 320, 322 provide a reference point that clock to clock conversions may pivot through, if viewed as a graph. According to an embodiment, the time scaler data 320, 322 is not stored, but is determined at a particular point in time; for example, when a time base based in one clock needs to be related to a time base based in another clock. By determining a clock's current rate scaler to the common reference clock, an algebraic transformation may be utilized to determine the relationships between two points on disparate time bases rooted in disparate clocks. For example, a time (represented by a time stamp) in one time base may be translated into a time in another time base where the time bases are rooted in separate clocks, thereby allowing for the synchronization of data in the time-based data stream, such as video or audio. In another example, a time duration, which could be a time stamp or determined by evaluating time stamp data, in one time base may be translated into a time duration in another time base where the time bases are rooted in separate clocks, thereby allowing for the synchronization of data in the time-based data stream, such as video or audio.

For example, for a specific frame of video (determined by evaluating time base 318), the specific portion of audio content (determined by evaluating time base 310) that relates to the frame may be derived algebraically by relating times in disparate time bases. As discussed before, the concept of time in the video and audio time bases is defined relative to their respective clocks 306 and 314. In the examples given, times are represented by time stamp data and operations are performed on the time stamp data, although alternate measures of time are envisioned.

According to an embodiment, a specific time in the video content (perhaps associated with a specific frame) may be determined by subtracting an anchor time stamp, taken or received from the video clock at the same time an anchor time stamp is taken or received from the video time base, from the video clock's current time. This result is multiplied by the rate at which the video is playing and the product is added to the anchor time stamp taken or received from the video time base at the same time the anchor time stamp was taken or received from the video clock.

$$t\_video=((t\_clock314-anchor\_clock314\_video)*rate\_video)+anchor\_video$$

According to an embodiment, a specific time in the audio content may be evaluated in a similar manner by the example equation:

$$t\_audio=((t\_clock306-anchor\_clock306\_audio)*rate\_audio)+anchor\_audio$$

The times of clocks are not algebraically related, but current values of the relative rate scalers 320 and 322 are known. In an embodiment, current times of the clocks are measured at the same time to provide the simultaneous clock-to-clock anchors anchor_clock302 (the current time of the common reference clock), anchor_clock306 (the current time of the audio clock) and anchor_clock314 (the current time of the video clock). According to an embodiment, this measurement is provided by analyzing time stamp data.

According to an embodiment, the approach allows the derivation of an approximate relationship between a near-future or near-past group of simultaneous clock times, in this example labeled: t_clock302, t_clock306 and t_clock314. First, a time in the audio clock 306 may be derived based on the common reference clock 302.

$$t\_clock306=((t\_clock302-anchor\_clock302)*rate\_scaler\_320+anchor\_clock306$$

Next, a time in the video clock 314 may be derived based on the common reference clock 302.

$$t\_clock314=((t\_clock302-anchor\_clock302)*rate\_scaler\_322+anchor\_clock314$$

According to an embodiment, rate scalers must always be nonzero since clocks always move, which allows the following modification of the equation.

$$t\_clock302=((t\_clock314-anchor\_clock314)/rate\_scaler\_322+anchor\_clock302$$

Substitution of variables provides the following:

$$t\_clock306=((((t\_clock314-anchor\_clock314)/rate\_scaler\_322+anchor\_clock302)-anchor\_clock302)*rate\_scaler\_320+anchor\_clock306$$

Simplification of the equation provides:

$$t\_clock306=(((t\_clock314-anchor\_clock314)/rate\_scaler\_322)*rate\_scaler\_320+anchor\_clock306$$

Provided that rate_video is nonzero, the video equation may be rewritten:

$$t\_clock314=((t\_video-anchor\_video)/rate\_video)+anchor\_clock314\_video$$

Substitution of variables provides the following:

$$t\_audio=(((((((t\_video-anchor\_video)/rate\_video)+anchor\_clock314\_video-anchor\_clock314)/rate\_scaler\_322)*rate\_scaler\_320+anchor\_clock306-anchor\_clock306\_audio)*rate\_audio)+anchor\_audio$$

The above approach is an example embodiment that allows for a relationship between a first set of time-based data (the audio time base) and a second set of time based data (the video time base) based on separate timing devices (the audio clock and the video clock) to be determined based on the relationship between the clock rate of the common reference clock and each of the audio clock and the video clock. For example, a time stamp in the video time base may be translated to a time stamp in the audio time base even though the video and audio time bases are rooted in separate clocks. As another example, a time duration in the video time base may be translated to a time duration in the audio time base even though the video and audio time bases are rooted in separate clocks. This allows synchronization of the time-based data and allows for getting from a point or points in one time base to a point or points in another time base.

In another example, the approaches described herein may be used to identify a point within a first time-based data stream, such as a video, that is associated with a time value generated based on a first timing device, such as a specific frame of the video associated with a specific time in the video stream time base that is rooted in a clock. Given this point, a corresponding point in a second time-based data stream, such as another video or an audio stream, that is associated with a time value generated based on a second timing device, such as a specific frame of another video associated with a specific time in the second video stream's time base that is rooted in a separate clock, may be determined. In one example, this may be determined based on analyzing the difference between the clock rate of the first timing device and a third timing device, and analyzing the difference between the clock rate of the second timing device and a third timing device.

In another example, the approaches described herein may be used to drive consumption of a first set of video frames based on a first rate associated with the video frames and a first set of anchor time stamp pairs as described herein. In this example, neither the rate nor the anchor time stamp pairs are associated with any particular time base. Along with the first set, consumption of a second set of video frames based on a first rate associated with the video frames and a first set of anchor time stamp pairs as described herein may be utilized, and a relationship determined between the first set of video frames and the second set of video frames based on the difference between the clock rate of the timing device associated with the first set of anchor time stamp pairs and the clock rate of a third device, and the clock rate of the timing device associated with the second set of anchor time stamp pairs and the clock rate of a third device.

According to an embodiment, the instantaneous relative rate between time bases, in this example the audio time base 310 and the video time base 318, may be calculated as the derivative of the equation in paragraph 0052 with respect to t_video, namely:

rate_audio_video=(((1/rate_video)/rate_scaler_322)*
rate_scaler_320)*rate_audio

Which may be expressed as:

rate_audio_video=(rate_audio*rate_scaler_320)/
(rate_scaler_322*rate_video)

According to an embodiment, the relative rate may be used to resample audio to keep it in sync with the video. For example, if the time bases 310, 312, 318 are all running at rate 1, the audio clock 306 is running 0.1% faster than the common reference clock 302 (i.e., rate_scaler_320 is 1.001) and the video clock 314 is running 0.1% slower than the common reference clock 302 (i.e., rate_scaler_322 is 0.999), then audio must be played 1.002 times slower than normal (1.001/ 0.999). 48 kHz audio would need to be resampled to 48096 Hz, to extend the duration by 0.2%.

According to an embodiment, calculations are performed instantaneously and the measurements and adjustments are repeated periodically to obtain the most current values. According to an embodiment, the approaches described herein may be used to allow a clock, such as the video clock described earlier, to automatically determine what time it should be or receive input indicating the appropriate time. According to an embodiment, the approaches described herein are not limited to a specific number of clocks, as any number of clocks may be based on a common reference clock. Further, any number of clocks may be based upon a hierarchy of clocks based on a common reference clock.

Synchronizing Times with Common Reference Clock

Figure 4:
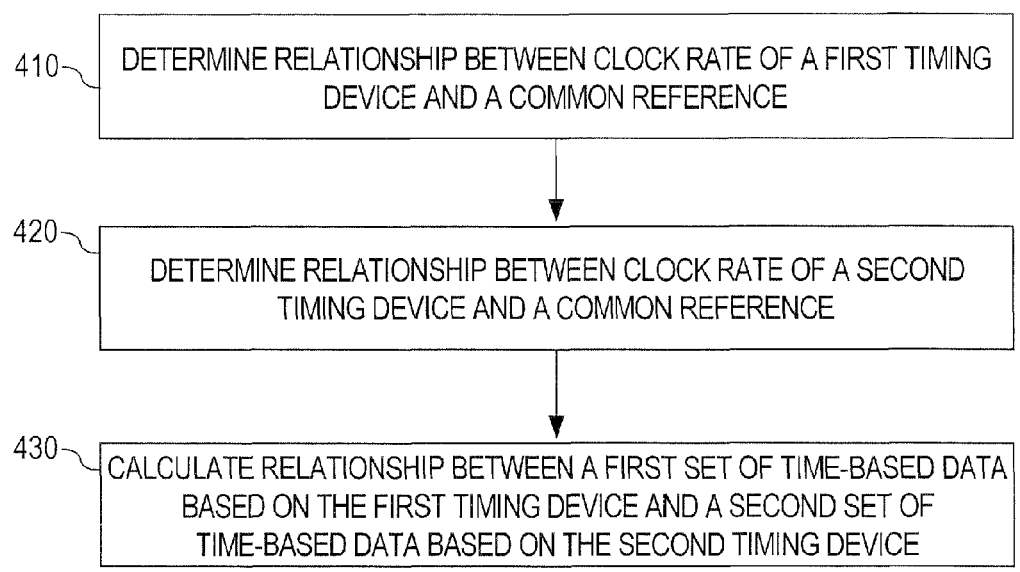
FIG. 4 is a flowchart illustrating the functional steps of synchronizing times with a common reference clock according to an embodiment of the invention.

FIG. 4 is a flowchart illustrating the functional steps of synchronizing times with a derived common reference clock according to an embodiment of the invention. The particular sequence of steps illustrated in FIG. 4 is merely illustrative for purposes of providing a clear explanation. Other embodiments of the invention may perform various steps of FIG. 4 in parallel or in a different order than that depicted in FIG. 4.

In step 410, a relationship between a clock rate of a first timing device, such as a video clock, and a common reference, such as a CPU clock or network clock, is determined. According to an embodiment, this relationship is the rate scaler between the first timing device and the common reference. According to an embodiment, the rate scalers between a common reference clock and any number of other clocks may be determined. According to an embodiment, this determination is made on a periodic basis. Because of the property of clocks to drift, the more often the determination is made, the more accurate the time synchronization and translations may be.

In step 420, a relationship between a clock rate of a second timing device, such as an audio clock, and the same common reference used in step 410, such as a CPU clock or network clock, is determined.

In step 430 a third relationship is calculated between a first set of time-based data that is based on the first timing device, such as a video stream with a time base rooted in the video clock, and a second set of time-based data that is based on the second timing device, such as an audio stream with a time base rooted in the audio clock. According to an embodiment, the rate scalers determined in steps 410 and 420 are used to translate times from a time base in the first set of time-based data to a time base in the second set of time-based data. According to an embodiment, this may be performed upon request or automatically.

Implementing Mechanisms

Figure 5:
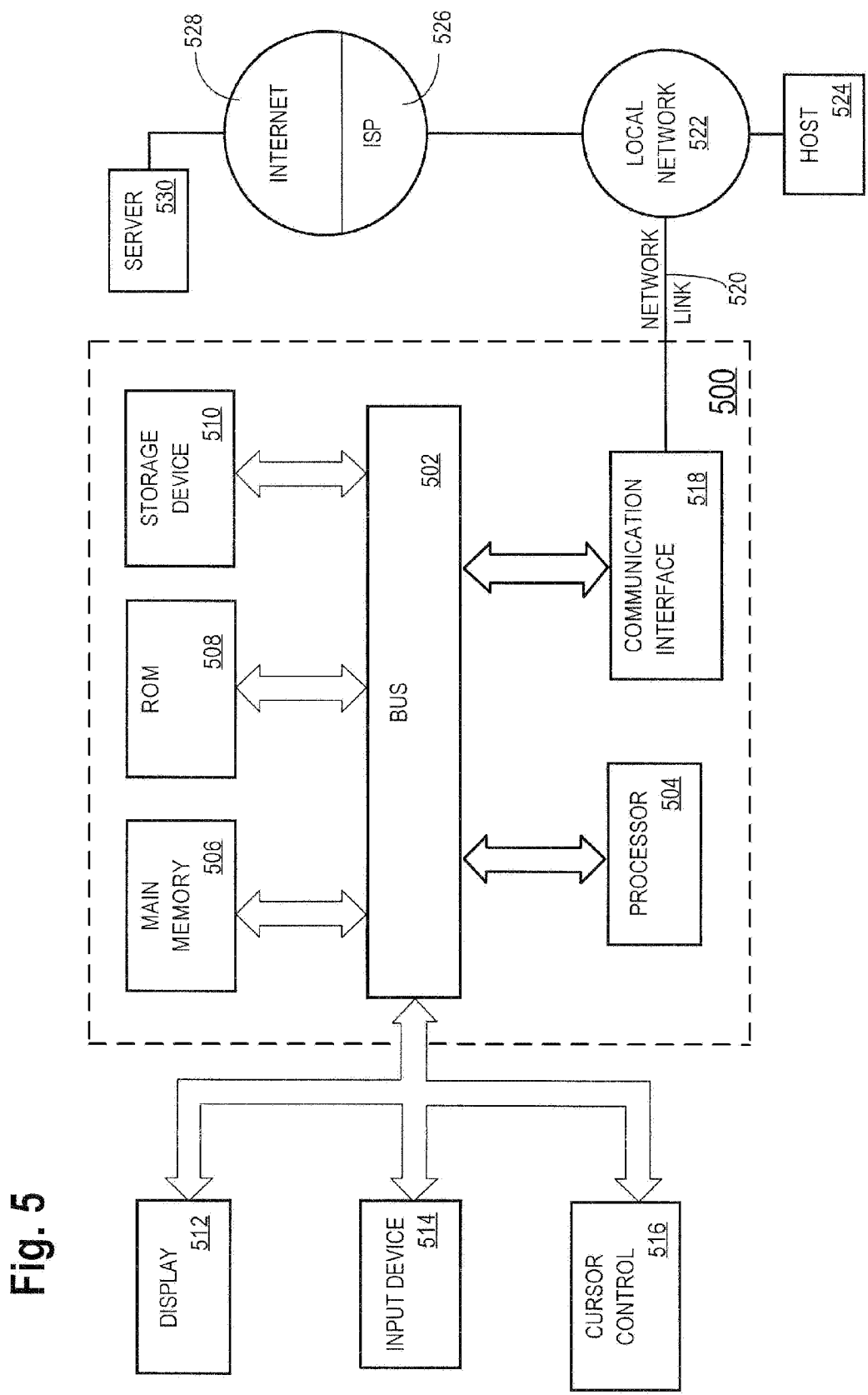
FIG. 5 is a block diagram that illustrates a computer system upon which an embodiment of the invention may be implemented

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for playing multi-media data, comprising:
   a first multi-media data rendering timing device;
   a second multi-media data rendering timing device;
   a reference timing device; and
   a processor that determines a first relationship between a clock rate of the first multi-media data rendering timing device and a clock rate of the reference timing device,
   wherein the processor determines a second relationship between a clock rate of the second multi-media data rendering timing device and the clock rate of the same reference timing device,
   wherein, based at least partially upon the first relationship and the second relationship, the processor determines a timing relationship between (a) a first time base that is based on the first multi-media data rendering timing device and (b) a second time base that is based on the second multi-media data rendering timing device,
   wherein the apparatus plays multi-media data based upon the determined timing relationship, and
   wherein the first multi-media data rendering timing device and the second multi-media data rendering timing device are separate timing devices having clock rates that are independent of and different from each other.

2. The apparatus of claim 1, wherein the multi-media data comprise a plurality of multi-media data streams.

3. The apparatus of claim 1, wherein the multi-media data comprises at least one of video data, audio data, and closed captioning data.

4. The apparatus of claim 1, wherein the apparatus is a movie playing device.

5. The apparatus of claim 1, wherein each of the first multi-media data rendering timing device, the second multi-media data rendering timing device, and the reference timing device comprises: timing information generated based upon one of: video timing, Musical Instrument Digital Interface (MIDI) sequencer timing information, Society of Motion Picture and Television Engineers (SMPTE) time code, timing information delivered via radio signals, and atomic clock timing information.

6. The apparatus of claim 1, further comprising a communication interface that receives the multi-media data.

7. The apparatus of claim 6, wherein the communication interface comprises at least one of a local area network (LAN) interface, an Integrated Services Digital Network (ISDN) interface, a telephone modem, an optical link, and a wireless link.

8. A method of playing multi-media data in an apparatus, comprising:
    determining, by a processor, a first relationship between a clock rate of a first multi- media data rendering timing device in the apparatus and a clock rate of a reference timing device in the apparatus,
    wherein the processor determines a second relationship between a clock rate of a second multi-media data rendering timing device in the apparatus and the clock rate of the same reference timing device in the apparatus,
    wherein, based at least partially upon the first relationship and the second relationship, the processor determines a timing relationship between (a) a first time base that is based on the first multi-media data rendering timing device and (b) a second time base that is based on the second multi-media data rendering timing device,
    wherein the apparatus plays multi-media data based upon the determined timing relationship, and
    wherein the first multi-media data rendering timing device and the second multi-media data rendering timing device are separate timing devices having clock rates that are independent of and different from each other.

9. The method of claim 8, wherein the multi-media data comprise a plurality of multi-media data streams.

10. The method of claim 8, wherein the multi-media data comprises at least one of video data, audio data, and closed captioning data.

11. The method of claim 8, wherein the apparatus is a movie playing device.

12. The method of claim 8, wherein each of the first multi-media data rendering timing device, the second multi-media data rendering timing device, and the reference timing device comprises: timing information generated based upon one of: video timing, Musical Instrument Digital Interface (MIDI) sequencer timing information, Society of Motion Picture and Television Engineers (SMPTE) time code, timing information delivered via radio signals, and atomic clock timing information.

13. The method of claim 8, further comprising a communication interface that receives the multi-media data.

14. The method of claim 13, wherein the communication interface comprises at least one of a local area network (LAN) interface, an Integrated Services Digital Network (ISDN) interface, a telephone modem, an optical link, and a wireless link.

15. A non-transitory computer readable medium storing program codes executable by a process to play multi-media data in an apparatus by performing:
    determining, by the processor, a first relationship between a clock rate of a first multi-media data rendering timing device in the apparatus and a clock rate of a reference timing device in the apparatus,
    wherein the processor determines a second relationship between a clock rate of a second multi-media data rendering timing device in the apparatus and the clock rate of the same reference timing device in the apparatus,
    wherein, based at least partially upon the first relationship and the second relationship, the processor determines a timing relationship between (a) a first time base that is based on the first multi-media data rendering timing device and (b) a second time base that is based on the second multi-media data rendering timing device,
    wherein the apparatus plays multi-media data based upon the determined timing relationship, and
    wherein the first multi-media data rendering timing device and the second multi-media data rendering timing device are separate timing devices having clock rates that are independent of and different from each other.

16. The non-transitory computer readable medium of claim 15, wherein the multi-media data comprise a plurality of multi-media data streams.

17. The non-transitory computer readable medium of claim 15, wherein the multi-media data comprises at least one of video data, audio data, and closed captioning data.

18. The non-transitory computer readable medium of claim 15, wherein the apparatus is a movie playing device.

19. The non-transitory computer readable medium of claim 15, wherein each of the first multi-media data rendering timing device, the second multi-media data rendering timing device, and the reference timing device comprises: timing information generated based upon one of: video timing, Musical Instrument Digital Interface (MIDI) sequencer timing information, Society of Motion Picture and Television Engineers (SMPTE) time code, timing information delivered via radio signals, and atomic clock timing information.

20. The non-transitory computer readable medium of claim 15, further comprising a communication interface that receives the multi-media data, wherein the communication interface comprises at least one of a local area network (LAN) interface, an Integrated Services Digital Network (ISDN) interface, a telephone modem, an optical link, and a wireless link.

* * * * *